(12) United States Patent
Dozier et al.

(10) Patent No.: US 12,537,369 B2
(45) Date of Patent: Jan. 27, 2026

(54) HOOK SWING MOUNTING FEATURE

(71) Applicant: Schneider Electric USA, Inc., Andover, MA (US)

(72) Inventors: Steven Wayne Dozier, Murfreesboro, TN (US); Charles Wesley Travis, Jr., Murfreesboro, TN (US)

(73) Assignee: Schneider Electric USA, Inc., Boston, MA (US)

( * ) Notice: Subject to any disclaimer, the term of this patent is extended or adjusted under 35 U.S.C. 154(b) by 216 days.

(21) Appl. No.: 18/017,254

(22) PCT Filed: Jul. 23, 2021

(86) PCT No.: PCT/US2021/043030
§ 371 (c)(1),
(2) Date: Jan. 20, 2023

(87) PCT Pub. No.: WO2022/020753
PCT Pub. Date: Jan. 27, 2022

(65) Prior Publication Data
US 2023/0307896 A1 Sep. 28, 2023

Related U.S. Application Data

(60) Provisional application No. 63/055,927, filed on Jul. 24, 2020.

(51) Int. Cl.
*H02G 5/00* (2006.01)
*H02B 1/01* (2006.01)
(Continued)

(52) U.S. Cl.
CPC ............ *H02G 5/007* (2013.01); *H02B 1/012* (2013.01); *H02B 1/04* (2013.01); *H02B 1/056* (2013.01);
(Continued)

(58) Field of Classification Search
None
See application file for complete search history.

(56) References Cited

U.S. PATENT DOCUMENTS

| 5,657,641 | A | 8/1997 | Cunningham et al. |
| 7,858,886 | B2 * | 12/2010 | Helms ...................... H02B 1/40 |
| | | | 361/733 |

(Continued)

FOREIGN PATENT DOCUMENTS

| CN | 203326374 U | 12/2013 |
| CN | 103687354 A | 3/2014 |
| CN | 211630594 U | 10/2020 |

OTHER PUBLICATIONS

International Search Report and Written Opinion mailed Nov. 24, 2021 in International Application No. PCT/US2021/043030, 45 pages.
(Continued)

*Primary Examiner* — Mukundbhai G Patel
(74) *Attorney, Agent, or Firm* — Kinney & Lange, P.A.

(57) ABSTRACT

A system is provided for supporting an electrical component in an electrical device of an electrical distribution system. The system includes at least one hook connected to a cabinet frame or structural member of the electrical device; and at least one rod attached to the electrical component. The at least one rod is slidably received in the hook such that the electrical component is held in close proximity to the cabinet frame or structural member of the electrical device while the electrical component is being attached to the cabinet frame or structural member by hardware. The electrical component can be a bus assembly of a switchboard.

20 Claims, 17 Drawing Sheets

(51) Int. Cl.
*H02B 1/04* (2006.01)
*H02B 1/056* (2006.01)
*H02B 1/20* (2006.01)
*H02B 1/30* (2006.01)
*H02B 1/32* (2006.01)
*H02B 1/36* (2006.01)
*H02B 3/00* (2006.01)
*H02G 5/06* (2006.01)

(52) U.S. Cl.
CPC .............. *H02B 1/20* (2013.01); *H02B 1/306* (2013.01); *H02B 1/32* (2013.01); *H02B 1/36* (2013.01); *H02B 3/00* (2013.01); *H02G 5/06* (2013.01)

(56) References Cited

U.S. PATENT DOCUMENTS

| 2006/0102575 A1* | 5/2006 | Mattlin .................. H01R 11/01 211/192 |
| 2018/0062367 A1 | 3/2018 | Baillargeon et al. |

OTHER PUBLICATIONS

European Search Report and Search Opinion dated Jul. 23, 2024 for corresponding European Application No. EP21847140.7, 8 pages.

* cited by examiner

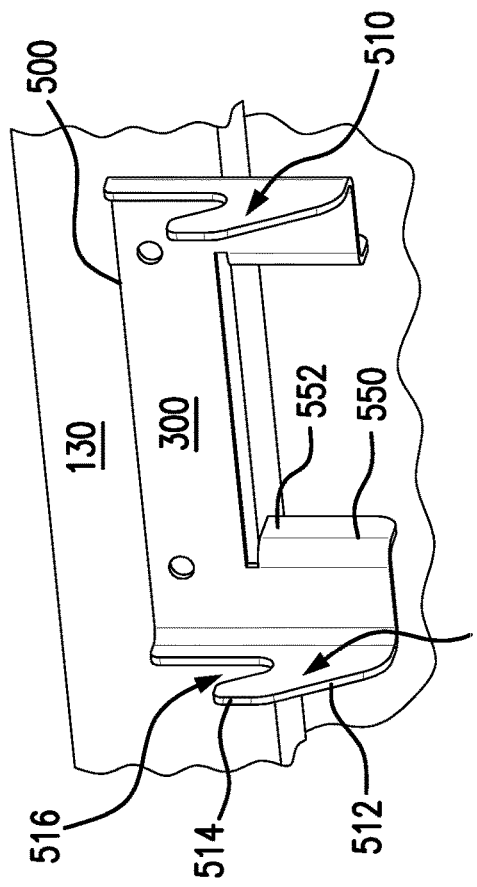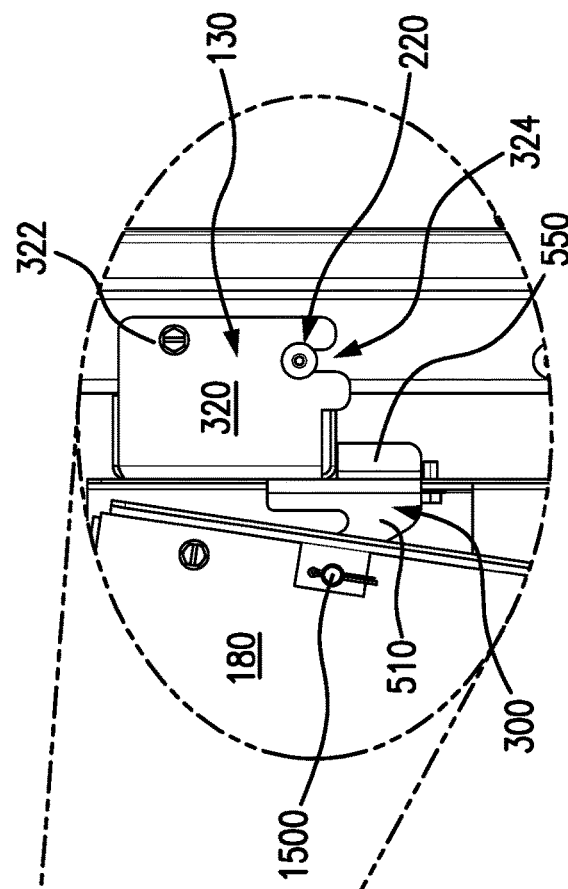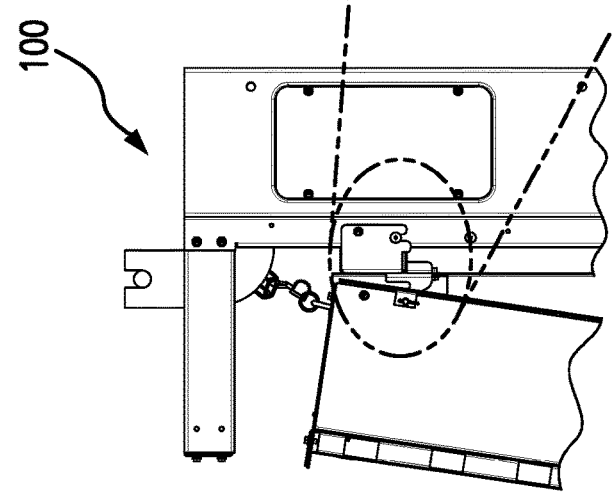
FIG. 16
FIG. 15

HOOK SWING MOUNTING FEATURE

RELATED CASE

The present application claims priority to U.S. provisional patent application Ser. No. 63/055,927, entitled MODULAR SWITCHBOARD, which was filed on Jul. 24, 2020 and is incorporated herein in its entirety.

TECHNICAL FIELD

The present disclosure relates to energy management, and more particularly, to a method and system for assembling and supporting electrical equipment for a power distribution system.

BACKGROUND

Conventional factory-assembled electrical equipment, such as switchboards, switchgears and other large electrical equipment for a power distribution system, may come in a relatively limited number of configurations, and generally such factory assembled equipment require a significant amount of electrical busbars, usually made of copper, which can be very expensive. When fully assembled, the electrical equipment, particularly switchboard or switchgear, can also be very large and very heavy, which means shipping to the jobsite can be expensive and maneuvering to its final location at the jobsite can be very difficult. A completely assembled equipment can also be more difficult for installers to wire since some components block or restrict areas of such equipment where electrical connections must be made.

SUMMARY

In accordance with an embodiment, a system is provided for supporting an electrical component in an electrical device of an electrical distribution system. The system includes at least one hook connected to a cabinet frame or structural member of the electrical device; and at least one rod attached to the electrical component. At least one rod is slidably received in the hook such that the electrical component is held in close proximity to the cabinet frame or structural member of the electrical device while the electrical component is being attached to the cabinet frame or structural member by hardware.

In an embodiment, the system can further include a support member including at least one hook and having two opposite ends. Each of the opposite ends includes a slot for engaging a corresponding pin on the cabinet frame and a fastener hole through which to fasten the end to the cabinet frame using a fastener when the slot is engaged to the corresponding pin on each end and the support member is pivoted about the corresponding pin to align the fastener hole to a respective hole on the cabinet frame. The slot at each end of the support can have an L-shape. At least one hook can include: a base having a front side and an opposite back side; a pair of hooks, extending from the front of the base, for supporting the electrical component; and a stop extending, from the back of the base, configured to abut against a portion of the support member.

In an embodiment, the hardware can comprise a plurality of fasteners configured to engage corresponding holes on the cabinet frame or structural member of the electrical device and the electrical component and attach the electrical component to the cabinet frame or structural member.

In an embodiment, at least one hook can include: a base having a front side and an opposite back side; a pair of hooks, extending from the front of the base, for supporting the electrical component; and a stop extending, from the back of the base, configured to abut against a portion of the cabinet frame or structural member. The pair of hooks can extend from opposite ends of the base. The base can include a plurality of fastener holes for fastening at least one hook to the cabinet frame or structural member of the electrical device using fasteners. At least one hook can be formed as a unitary or single-piece component. The electrical device can comprise a switchboard, and the electrical component comprises an electrical switchboard component. The electrical switchboard component can comprise a bus assembly for the switchboard.

In an embodiment, at least one hook can include: an exterior surface having a ramp profile for guiding the rod attached to an electrical component as the electrical component is being lifted; a tip; and a groove for receiving the rod.

In accordance with a further embodiment, a method is provided for assembling an electrical device having a cabinet frame. The method includes providing at least one hook connected to the cabinet frame or structural member of the electrical device; providing at least one rod attached to an electrical component; sliding at least one rod of the electrical component onto the hook such that the electrical component is held in close proximity to the cabinet frame or structural member of the electrical device; and attaching the electrical component to the cabinet frame or structural member by hardware.

In an embodiment, the operation of providing at least one hook can comprise: providing a support member including at least one hook and having two opposite ends, each end including a slot for engaging a corresponding pin on the cabinet frame and a fastener hole through which to fasten the end to the cabinet frame using a fastener; engaging the slot at each end of the support member to a corresponding pin on the cabinet frame; pivoting the support member about the pins to align the fastener hole to a respective hole on the cabinet frame; and securing a fastener through the aligned fastener hole at each end of the support member.

In an embodiment, in the method, at least one hook can include a base having a front side and an opposite back side; a pair of hooks, extending from the front of the base, for supporting the electrical component; and a stop extending, from the back of the base, configured to abut against a portion of the cabinet frame or structural member to provide relief for some of the weight of the electrical component when supported in the hook. The electrical device can comprise a switchboard, and the electrical component comprises an electrical switchboard component. The electrical switchboard component can comprise a bus assembly for the switchboard. At least one hook can include: an exterior surface having a ramp profile for guiding the rod attached to an electrical component as the electrical component is being lifted; a tip; and a groove for receiving the rod.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIG. 15 illustrates a partial view of the rod of the electrical component being placed on the hooks of the hook bracket on the support member mounted on the frame, in accordance with an embodiment.

FIG. 16 illustrates a partial view of the hook bracket connected to the support member mounted on the frame, in accordance with an embodiment.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
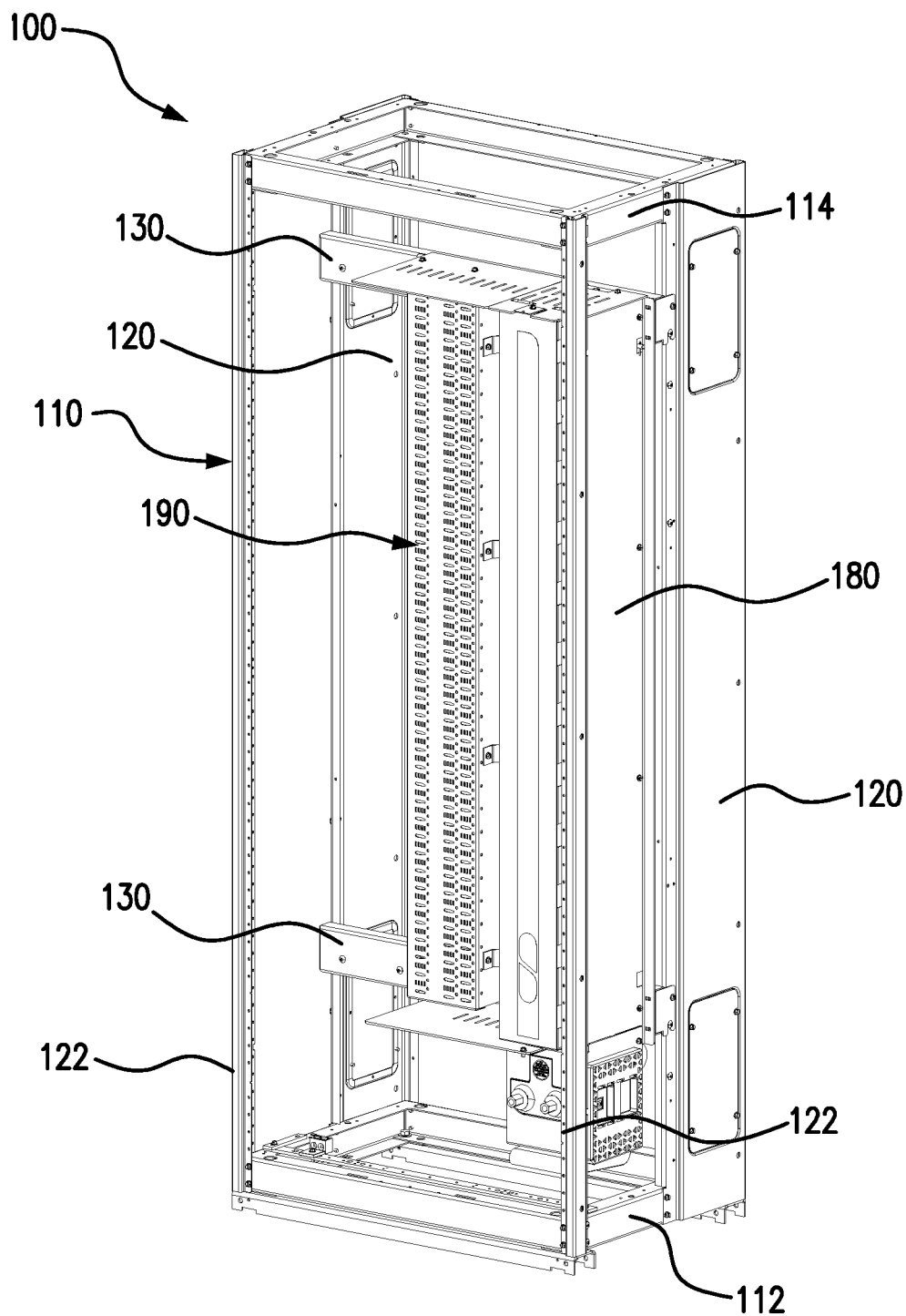
FIG. 1 illustrates a perspective view of example components of an electrical device of a power distribution system, in accordance with an embodiment.

The present disclosure is directed to a method and system for facilitating assembly of electrical equipment or device (hereinafter "electrical device") of a power distribution system. The electrical device can be a switchboard or switchgear (hereinafter "switchboard") or other electrical equipment, which may include heavy electrical component(s) that may require assembly into an electrical enclosure or cabinet (hereinafter "electrical cabinet"). The electrical device can be a low-voltage switchboard. In accordance with an embodiment, to facilitate assembly at a jobsite or desired site, the electrical device can include kits for a hoist assembly and hook mount assembly, which can be easily assembled onto a frame of an electrical cabinet ("cabinet frame"). The hoist assembly can include a hoist mechanism (e.g., a chain hoist, rope hoist or other hoist system), which when assembled onto the cabinet frame, can be used to lift and position electrical component(s) in the cabinet frame of the electrical device. The hoist assembly can be easily dissembled and removed from the cabinet frame, when no longer needed. In some embodiments, the frame, frame sections or subsections, support members and other structural members of the electrical device can be formed of a metal (e.g., stainless steel or other metals), or other material. In various embodiments, the hoist assembly can be assembled onto the frame without the use of any fasteners.

In accordance with a further embodiment, the hook mount assembly can include a hook bracket (also referred to as a "pivot bracket"), which is attached to the cabinet frame or support member of the electrical device. The hook bracket can include at least one hook for receiving a rod (also referred to as a "pivot rod") of an electrical component therein (or thereon) to support the electrical component in a desired position in close proximity to the cabinet frame or structural member of the electrical device. The electrical component can then be attached to the cabinet frame or structural member. The hook bracket also can include a stop, which can abut the cabinet frame (or a portion or component thereof) or structural member. The stop is configured to distribute the weight of the electrical component when placed on the hook(s) of the hook bracket. In some embodiments, the hook bracket is formed of a metal (e.g., stainless steel or other metals). In some embodiments, a plurality of hook brackets can be used to support, at least temporarily during assembly, one or more electrical components to be assembled for the electrical device. The hook bracket and rod can have a unique geometry that can secure a heavy structure being assembled to the frame and also can aid safety during the assembly process. The unique geometry of the hook bracket can be configured to ensure latching of the rod on the hooks of the bracket.

Furthermore, a hook swing mounting feature is provided for mounting the hook mount assembly onto the frame. For example, the hook mount assembly also can include a support member having the hook bracket. The support member can have two opposing ends, each of which has a slot and a fastener hole. The two ends of the support member can be inserted via their slots onto corresponding pins (e.g., pins, rivets, etc.) on opposing sections of the frame, and then pivoted (or swung) along the pins until the fastener holes are aligned with holes on the opposing sections of the frame.

Thereafter, the support member, along with the hook bracket, can be secured to the frame using fasteners, such as screw or bolt, which are secured through the aligned holes. Such a configuration can, for example, provide for ease of installation for non-skilled assembly personnel in the construction of electrical equipment, and reduce the number of people needed to assemble the equipment and minimize the need for lift assist equipment. Furthermore, the switchboard kits can be preliminary hung in place on shoulder pins/rivets then secured with a minimal number of mechanical fasteners (e.g., thread-forming screws). A significant benefit of the hook swing mounting feature removes the burden of trying to hold the kits in-place while driving the screws or other hardware. The shoulder rivets/pins can be pre-installed with the kit. In some embodiments, the hook swing mounting feature can makes use of commercially available shoulder pins/rivets, screws and sheetmetal components with specially designed features, as described herein, to ease installation of heavy switchboard components.

The various features described herein for facilitating assembly of an electrical device can, for example, provide an easy to attach tools and kits for aiding in lifting and supporting very heavy structure(s); and simple to use tools which can be easily assembled, disassembled and/or re-used. The hoist assembly and hook bracket also can reduce cost of assembly and tools, reduce overall area needed for assembly, and reduce human effort needed to lift heavy structure(s).

These and other features of the present disclosure will be described in further detail below with reference to the example figures.

FIG. 1 shows an example of an electrical device 100 of a power distribution system, in accordance with an embodiment. In this example, the electrical device 100 is a modular switchboard, which can be constructed from various pre-packaged modular kits. The modular kits can include, for example, kits for a frame, hoist assembly, different bus assemblies (e.g., line bus, load bus, through bus, I-line™ switchboard (including I-line™ bus assembly or bus stack and I-line™ circuit breaker) manufactured by Schneider Electric, etc.) and protective devices (e.g., main and branch breakers, fuses, etc.) or other components of a switchboard. These kits can be assembled into a switchboard main section or similar electrical device depending on the ordered kits. The assembly can take place at a jobsite or other location remote from the factory or location at which the prepackaged kits are prepared or stored. The various modular kits, when assembled by a certified assembler using a certified method and verification means provided by the modular kit manufacturer, are proposed to meet the requirement of third-party organizations such as Under Writer's Laboratories, Inc. (UL), the National Electrical Manufacturers Association (NEMA), the International Electrotechnical Commission (IEC) and/or the American National Standards Institute (ANSI); subject to evaluation of the construction by these organizations. The original order may require several switchboard frames connected together, each housing a segment (e.g., main breaker, I-line™ interior, utility bus or a lighting panel) of the complete switchboard assembly.

As shown in FIG. 1, the example electrical device 100 can include a frame 110 of an electrical enclosure or cabinet (hereinafter "cabinet frame"), which is provided for assembling, supporting and housing various components of the electrical device 100. The frame 110 includes a bottom section 112 (also referred to as a "base") and a top section 114 (also referred as a "roof") which is opposite the bottom section 112. The frame 110 also includes a plurality of upright frame sections, which are connected between the bottom section 112 and top section 114. The upright frame sections can include upright panels 120 on opposing back corners or sides, and upright bars 122 on opposing front corners.

As further shown in FIG. 1, the frame 110 also can include subsections, such as support members 130 for supporting one or more components of the electrical device. In this example, there are two horizontal support members 130, which are connected to the frame 110 at different or spaced-apart locations using hardware (e.g., fasteners, screws, washers, nuts and bolts or other coupling or fastening mechanisms). In this example, the two support members 130 have connected thereto at least a bus assembly 180 and a breaker support frame 190 for supporting circuit breakers or other protective devices, using hardware. In this example, the bus assembly 180 can be a pre-assembled bus stack of bus bars and insulators, such as an I-line™ bus, for a multi-phase power supply system (e.g., three-phase power supply system). The breaker support frame 190 can have a plurality of holes (e.g., holes, openings, slots, etc.) for mounting I-line™ branch circuit breakers (not shown) when connected to the I-line™ bus. An I-line™ electrical bus kit or the like can permit a number of branch circuit breakers to be installed in a small space within the electrical device 100.

When assembled, the electrical device 100 can include other electrical components including line bus assembly, load bus assembly, through bus assembly, main breaker and other electrical components for facilitating power protection and power distribution. The electrical device 100 also can include additional interior frame subsections or structural members for supporting other components of the electrical device 100, and include exterior panels (e.g., panels, doors, etc.) for enclosing the components of the electrical device 100 in the cabinet.

In an embodiment, the frame 110 can be provided as a frame kit. The upright panels 120 and upright bars 122 can have a cross-section of a particular shape which increases the strength of the upright frame subsections. The upright panels 120 and upright bars 122 can have pre-punched holes for assembly hardware. The bottom section 112 and top section 114 (e.g., generally 4 pieces each or formed from one metal sheet (e.g., steel) each) also can have pre-punched holes for assembly hardware and a cross-section of a particular shape which increases strength. The bottom section 112 and top section 114 can be attached to the upright panels 120 and upright bars 122 using hardware (e.g., fasteners, screws, washers, nuts and bolts) which can be provided in a hardware package prepared by the manufacturer specifically for the ordered frame kit. The hardware package can contain the correct number, diameter, length, thread pitch and gauge of hardware required for assembling the frame kit (and its frame components or subsections). In various embodiments, the electrical device 100 can be designed for poke-yoke assembly using modular components and pre-configured kits and packages.

In accordance with the present disclosure, the components of the electrical device 100 may be very heavy, such as for example the bus assembly 180 which may weigh over 100 to 200 pounds or more. To facilitate assembly of such heavy components at a jobsite or other desired site, a hoist kit and a hook bracket(s) can be provided for the electrical device 100 to facilitate the lifting, positioning and support of components within the frame 110 when assembling the electrical device 100. In this way, the electrical device 100 can be assembled in the upright position at a desired site, instead of at a factory, with minimal personnel (or user(s)), safety, and ease. An example of the assembly of the hoist kit and hook brackets on the frame 110 will be described below with reference to FIGS. 2-8. The assembly of a component of the electrical device will be described further below with reference to FIGS. 9-17.

Figure 2:
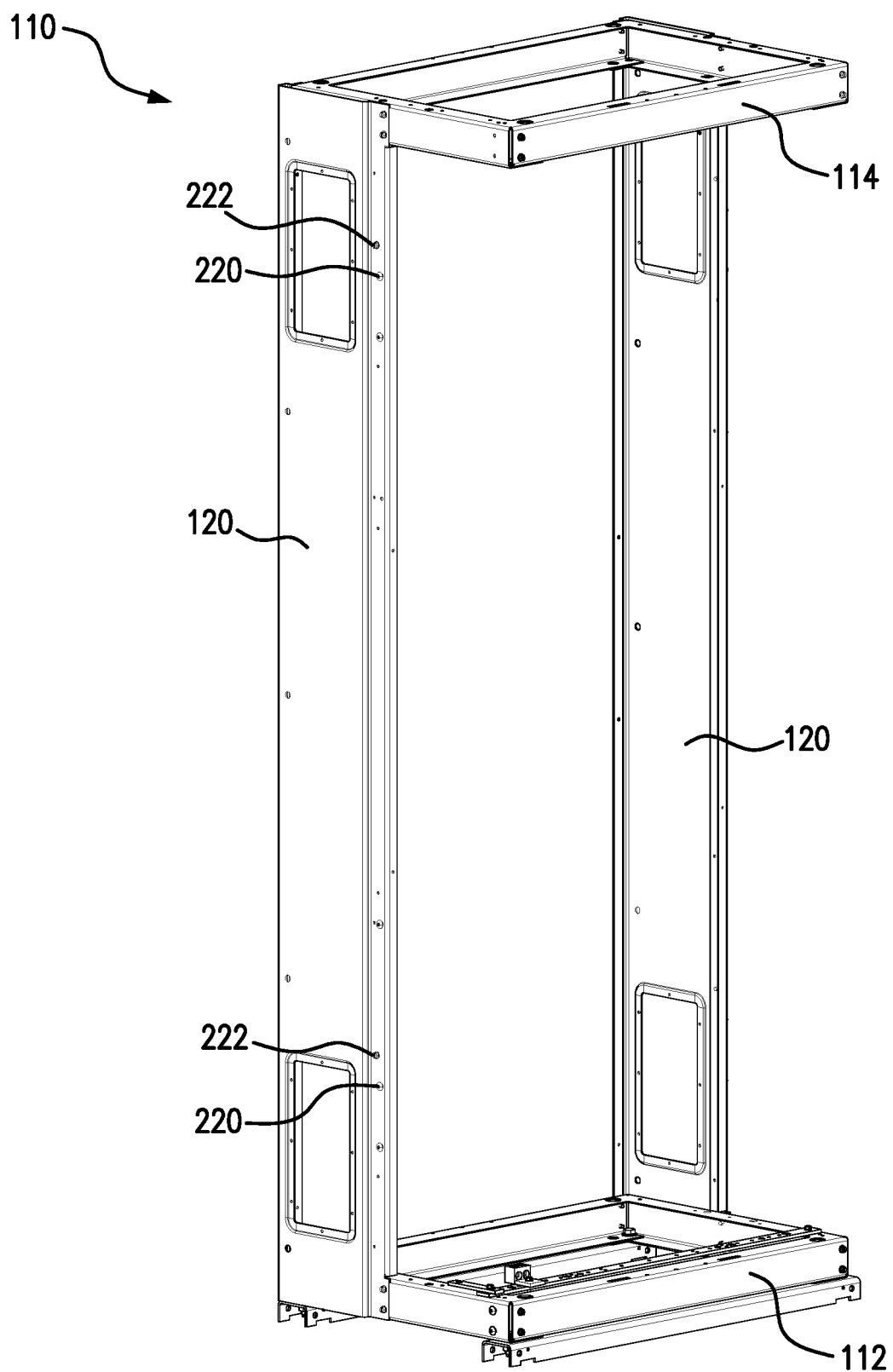
FIG. 2 illustrates a perspective view of a partially assembled frame of an electrical cabinet of the electrical device of FIG. 1, in accordance with an embodiment.

FIG. 2 illustrates a perspective view of a partially assembled frame 110 of an electrical cabinet of the electrical device 100 of FIG. 1, in accordance with an embodiment. As shown, the frame 110 can be initially assembled with the bottom section 112, top section 114 and upright panels 120 connected to or between the bottom and top sections 112 and 114. In this example, each upright panel 120 can include a matching set of a pin 220 and a hole 222 for securing a frame subsection, such as a support member, to the frame 110. For example, as further shown in FIGS. 3 and 4, two support members 130, each having a hook bracket 300, are provided with "swing mount" feature to connect the support members 130 to the frame 110, specifically the left and right upright panels 120, at different or spaced-apart locations. Each support member 130 can include opposing ends 320 having a hole 322 and a slot 324. To assemble each support member 130 onto the frame 110, the slot 324 on each end 320 of the support member 130 is inserted onto a corresponding pin 220 on a corresponding upright panel 120. Once the ends 320 of the support member 130 is supported by the pins 220 on the left and right upright panels 120, the support member 130 can be pivoted (or swung) about the pins 220 until the hole 322 of the support member 130 aligns with the hole 222 of the corresponding upright panel 120. Once aligned, assembly hardware (e.g., fasteners, screws, washers, nuts and bolts, etc.) can be used to attach the support member 130 to the corresponding upright panel 120 via the aligned holes 222 and 322. Depending on the number of personnel available, each end 320 of the support member 130 can be attached one at a time or at the same time to corresponding upright panels 120. In some embodiments, the slot 324 of the support member 130 can have an L-shape with an open end for receiving a pin (or the like).

In accordance with an embodiment, a height of the pin 220 (e.g., a shoulder pin or rivet, etc.) on the frame 110 (or section thereof) can be selected to provide sufficient clearance for a thickness of the adjoining part (e.g., sheetmetal part), but not too much as to compromise the strength of the joint. The pin 220 and hole 222 used for the securing screw can be placed at a certain distance apart such that it creates a unique correlation to poka-yoke the mounting location for the support member 130 or its ends 320. In some cases, multiple shoulder pins 220 can be used to hang the hook swing mount kits for mounting the hook bracket 300 on the frame 110. Such a configuration can ensure that only one mounting location is possible for each hook swing mount kit, e.g., the support member 130 with the hook bracket 300, or the same-type of kit. The slots (e.g., 324) can be designed to securely hang the hook swing mount kits in place prior to adding the hardware, e.g., securing screw, for securing the kit components to the frame. This can be done to remove the burden of having to hold the components of the hook swing mount kits in place while adding the hardware.

Figure 3:
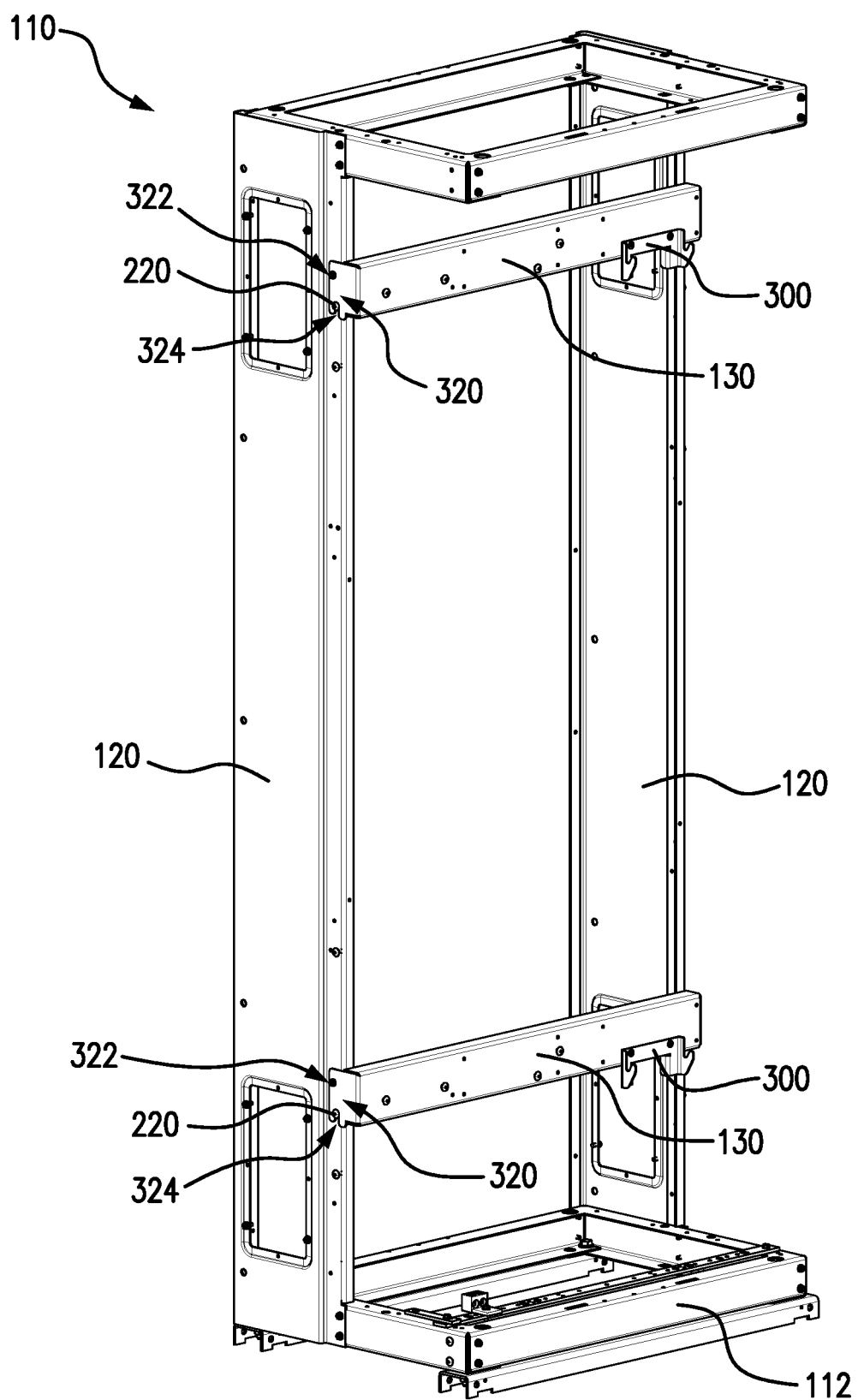
FIG. 3 illustrates a perspective view of a partially assembled frame in FIG. 2 with support members having hook brackets, in accordance with an embodiment.
Figure 4:
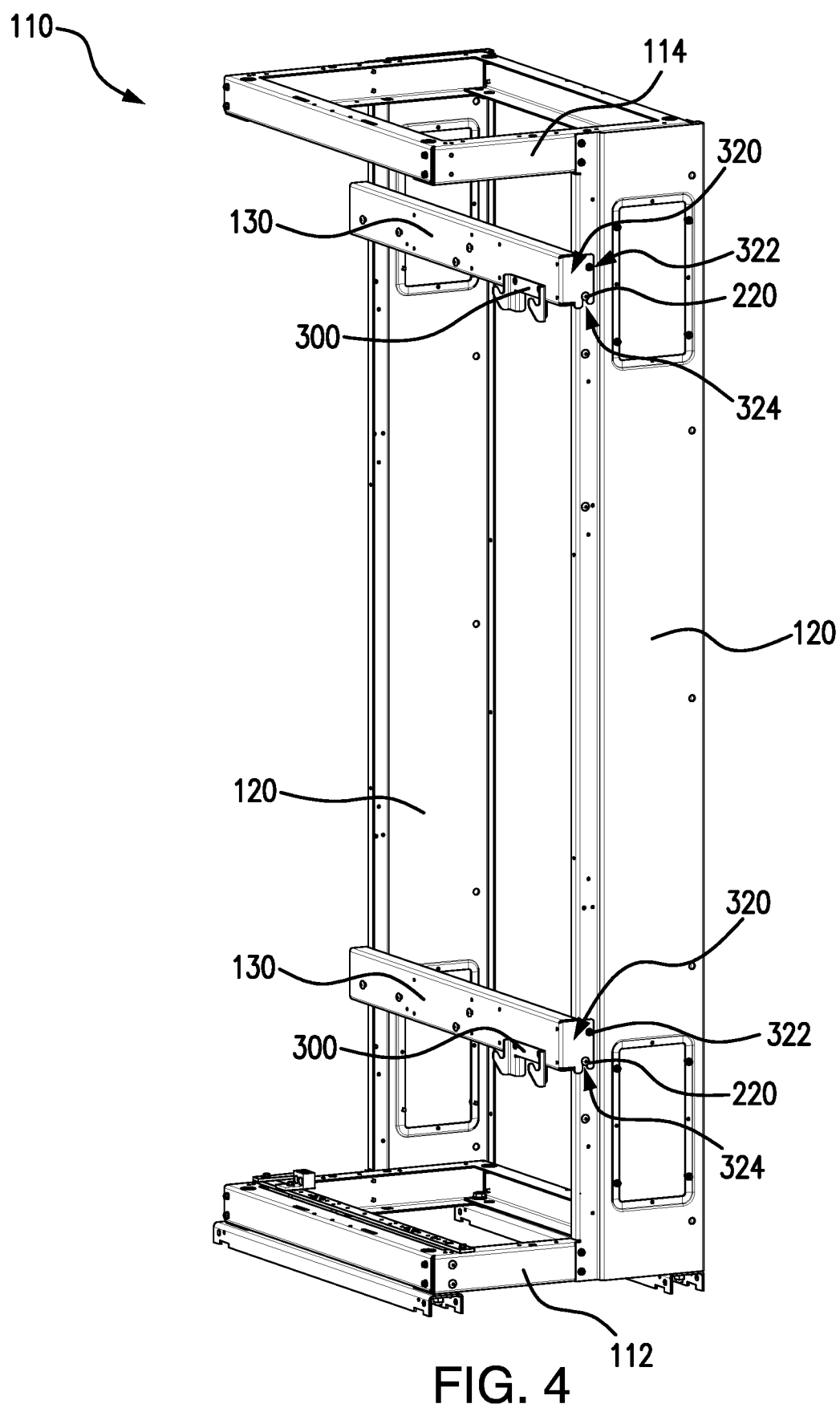
FIG. 4 illustrates another perspective view of a partially assembled frame in FIG. 2 with support members having hook brackets, in accordance with an embodiment.
Figure 5:
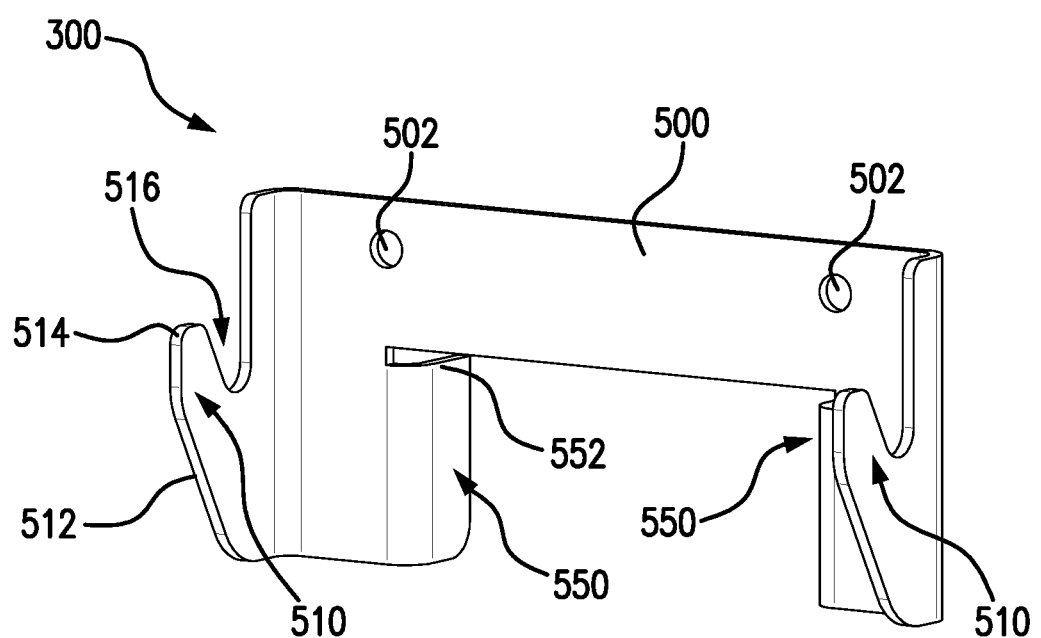
FIG. 5 illustrates an example hook bracket in FIGS. 3 and 4, in accordance with an embodiment.

As further shown in FIGS. 3 and 4, each of the support members 130 has a hook bracket 300 connected thereto using assembly hardware. As shown in FIG. 5, the hook bracket 300 can include a base 500 with mounting holes 502 to attach the hook bracket 300 to a subsection of the frame 110, such as the support member 130. In this example, the hook bracket 300 includes a plurality of hooks 510, in this case a pair of hooks 510 extending from a front (or in a front direction) of the base 500. The pair of hooks 510 extends from opposite ends of the base 500 of the hook bracket 300.

Each hook 510 includes an angled exterior surface 512 which extends at an angle towards a tip 514, and a groove 516 to receive and support an object in or on the hook 510. In an embodiment, the sections of the exterior surface 512 can have a ramp profile, which can become steeper (e.g., have a steeper angle towards vertical) as they get closer to the tip 514. As will be described further below, the exterior surface 512 can be used to guide an object as it is lifted up and into the groove 516 of the hook 510. The hook bracket(s) 300 and its hooks 510 can be used to support, at least temporarily, a component of the electrical device 100 at a desired position relative to or in close proximity to the frame 110 or other structural member thereon during assembly. The component supported by the hooks 510 can thereafter be securely attached to the frame 110 or its support member 130, such as using hardware, without the need for people to physically support the component in the desired position as the component is being securely attached to the frame.

The hook bracket 300 also can include one or more stops 550, which extend from a back of the base 500 of the hook bracket 300 (or in the back direction opposite the front direction). Each stop 550 includes a top portion 552, which is configured to abut against the support member 130 when attached thereto. The stop 550, in combination with the support member 130, is configured to redistribute some of the weight carried by the hooks 510 when an object is received in or on the hooks 510. Although the hook bracket 300 is shown as having a pair of hooks 510 and stops 550, the hook bracket 300 can include any number of hooks and stops (e.g., one, two, three, etc.). The hook bracket 300 can be formed as a unitary or single piece component, or as a multiple pieces connected together. The hook bracket 300 can be made of a metal or other material, and can be formed using stamping, molding or other known manufacturing techniques. Furthermore, the hook bracket 300 can be formed separately and then attached to a frame section (e.g., support member 130) or formed as part of a frame section such as the support member 130 or other structural member.

Figure 6:
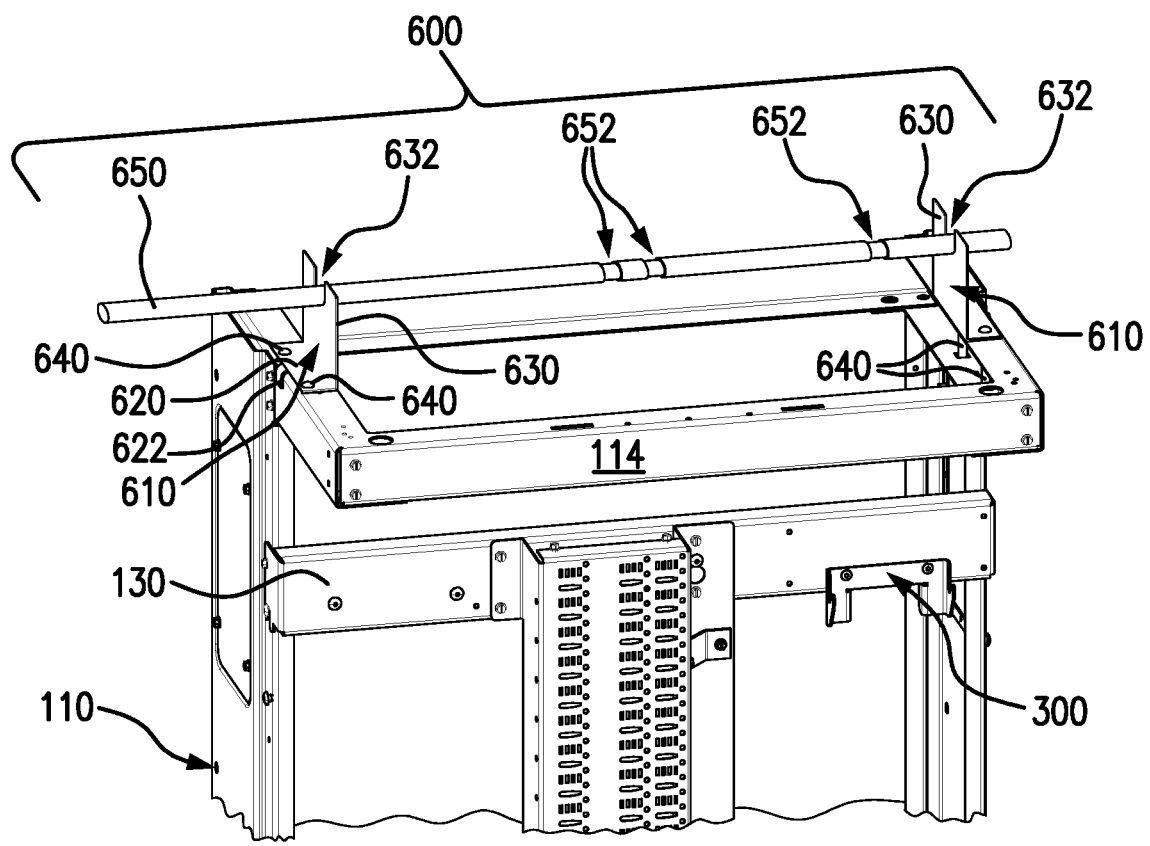
FIG. 6 illustrates a partial top perspective view of the frame in FIG. 2 with hoist support components of a hoist assembly, in accordance with an embodiment.
Figure 7:
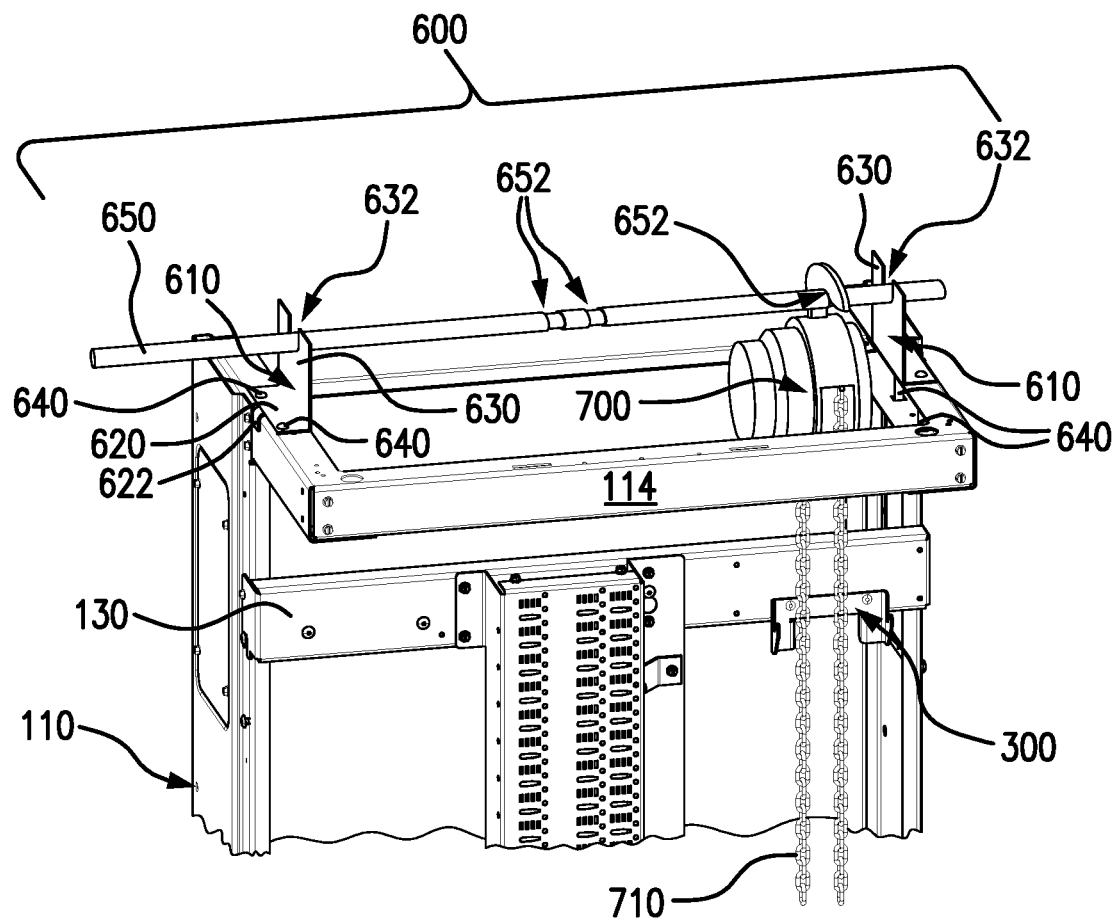
FIG. 7 illustrates a partial top perspective view of the frame in FIG. 2 with components of a hoist assembly, including a hoist, in accordance with an embodiment.
Figure 8:
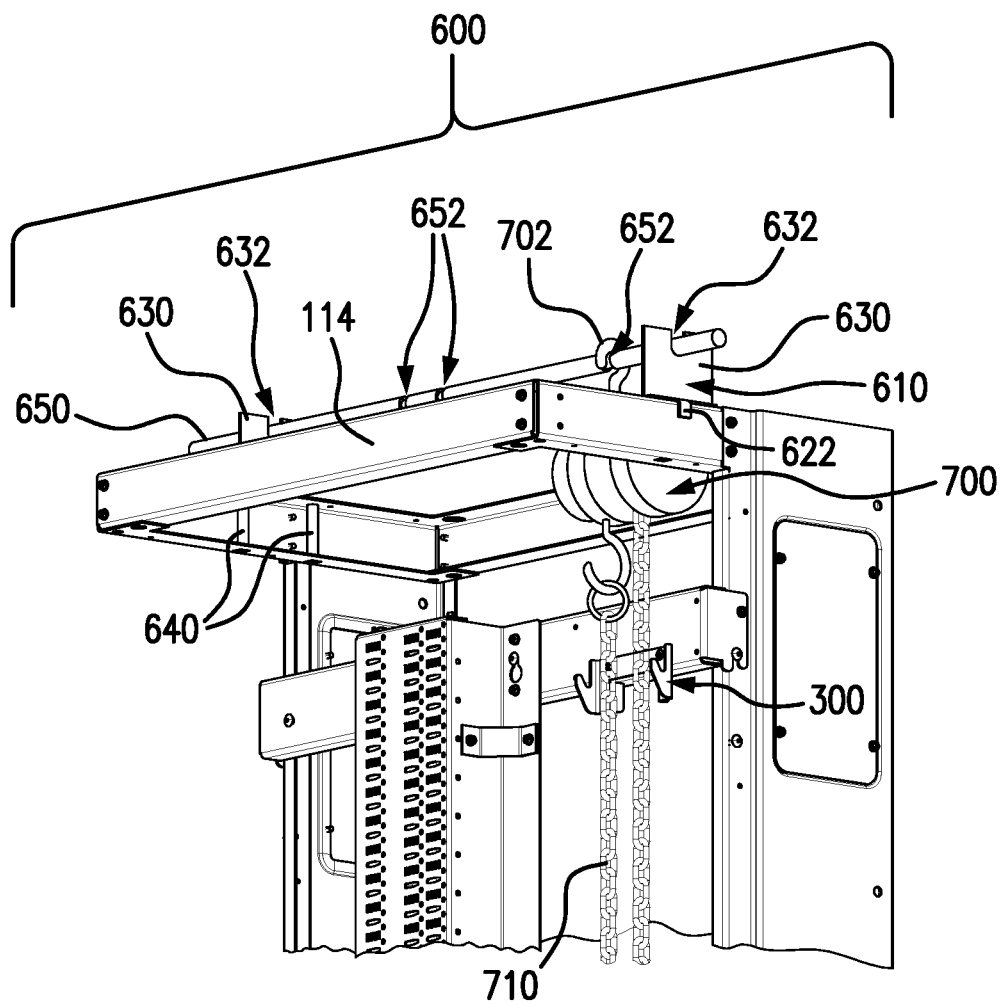
FIG. 8 illustrates another partial top perspective view of the frame in FIG. 2 with components of a hoist assembly, including a chain hoist mechanism, in accordance with an embodiment.

In accordance with a further embodiment, after the support member(s) 130 and hook bracket(s) 300 (along with other components, if desired) are connected to the frame 110, the hoist assembly 600 can be assembled onto the frame 110 as shown in FIGS. 6, 7 and 8. The hoist assembly 600 can be provided as a kit, which includes hoist brackets 610, hoist bar 650 (e.g., bar, rod, etc.), and a hoist mechanism 700. In this example, the hoist mechanism 700 is a chain hoist mechanism but can be any other suitable hoist mechanism for lifting components to a desired position in the frame 110. The hoist mechanism 700 also can be a motorized hoist mechanism.

As shown in FIG. 6, the hoist brackets 610 can be coupled (e.g., attached, coupled, engaged, connected, etc.) to the top section 114 of the frame 110. Each hoist bracket 610 can include a base 620 with an upward extending wall 630 having an indentation 632, and downward extending legs 640 which are configured to engage corresponding holes on the top section 114 of the frame 110. In this example, each leg 640 can extend through corresponding top and bottom holes on the top section 114, with the base 620 sitting on the top surface of the top section 114 of the frame 110. Once the hoist brackets 610 are coupled to the top section 114, the hoist bar 650 can be placed in the indentation 632 of each hoist bracket 610. Each of the hoist brackets 610 can include an extending tab 622, which extends downwards from an end of the base 620, for facilitating poka-yoke assembly (e.g., assembly in only one way) of the hoist bracket 620 on the frame 110. The hoist bar 650 can include at least one groove 652 for receiving an attachment (e.g., a hook) from the hoist mechanism 700 as shown in FIGS. 7 and 8. The hoist bar 650 can include a plurality of grooves at predefined positions along the bar to facilitate assembly, such as grooves for the bracket indentations 632 and grooves for the hoist mechanism at different positions depending on the component to be hoisted or desired hoisting position in the frame 110.

In this example, as further shown in FIGS. 7 and 8, the hoist mechanism 700 is a chain hoist with a chain 710 which can be extended and retracted. As further shown in FIG. 8, each leg 640 of the hoist bracket 610 can extend through corresponding top and bottom holes on the top section 114 of the frame 11. The holes on the top section 114 can be pre-formed to facilitate ease of assembly of the hoist brackets 610 onto the frame 110.

Figure 9:
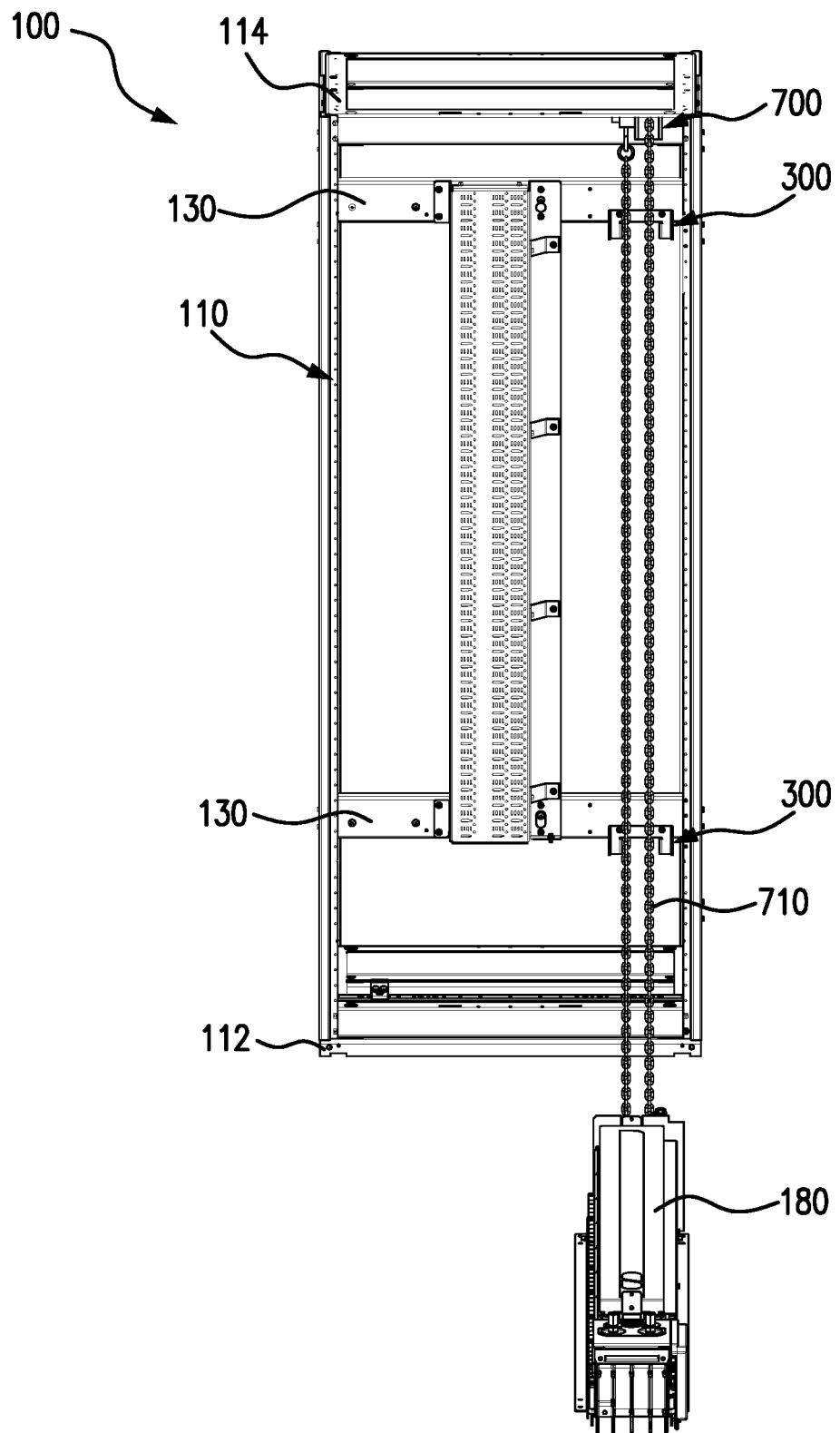
FIG. 9 illustrates a front view of the frame in FIG. 2 with the hoist assembly and an electrical component to be hoisted for assembly into the electrical device, in accordance with an embodiment.
Figure 10:
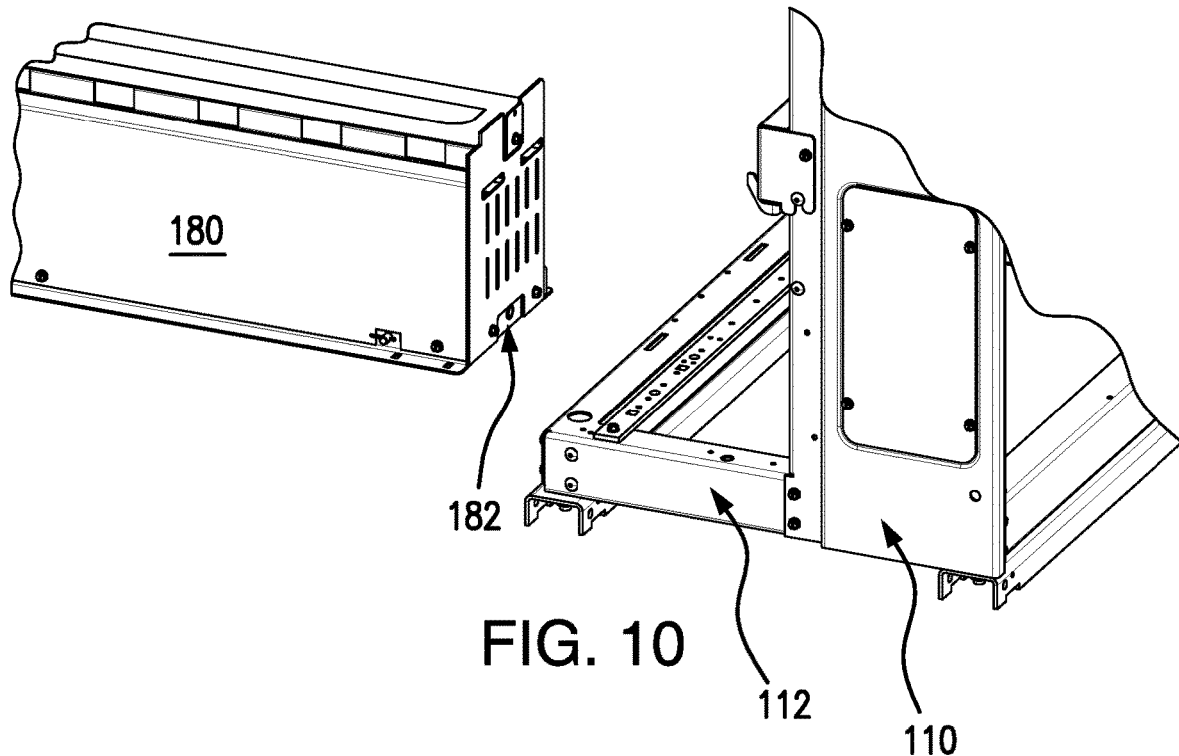
FIG. 10 illustrates a partial view of the frame of the electrical device and the electrical component to be hoisted for assembly in FIG. 9, in accordance with an embodiment.
Figure 11:
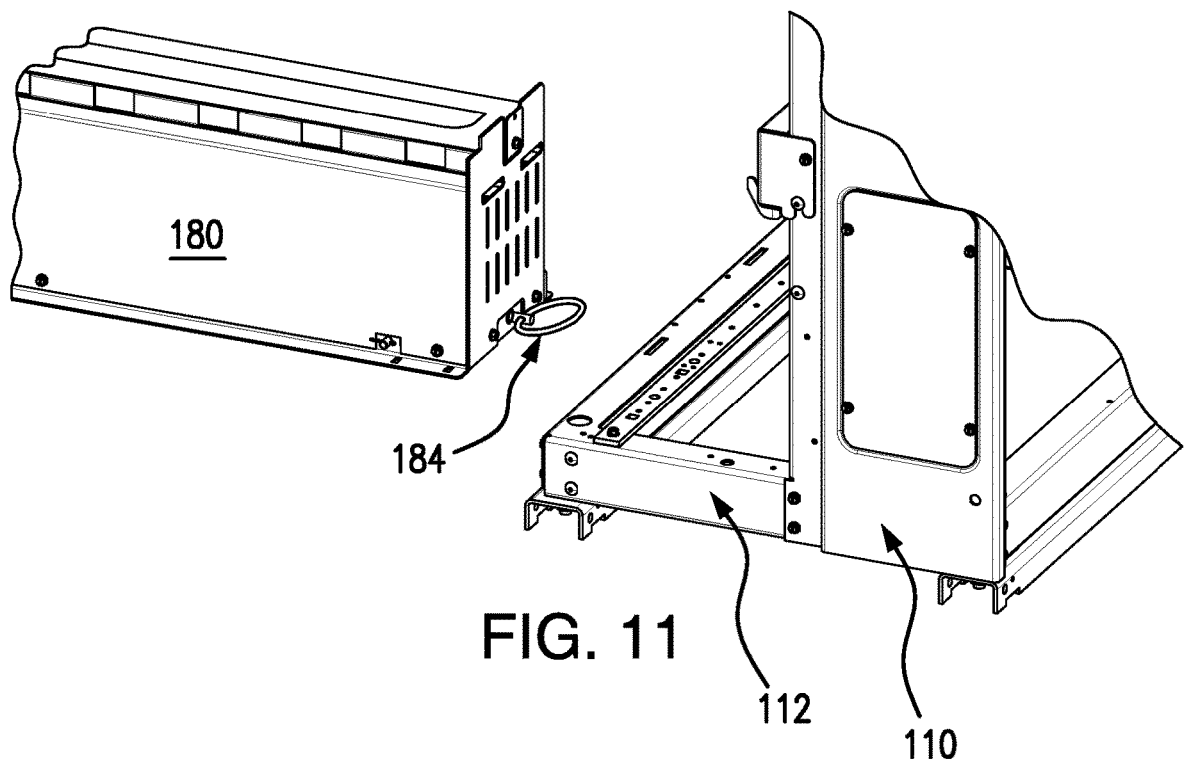
FIG. 11 illustrates a partial view of the frame of the electrical device and the electrical component (including an eye bolt) to be hoisted for assembly in FIG. 10, in accordance with an embodiment.
Figure 12:
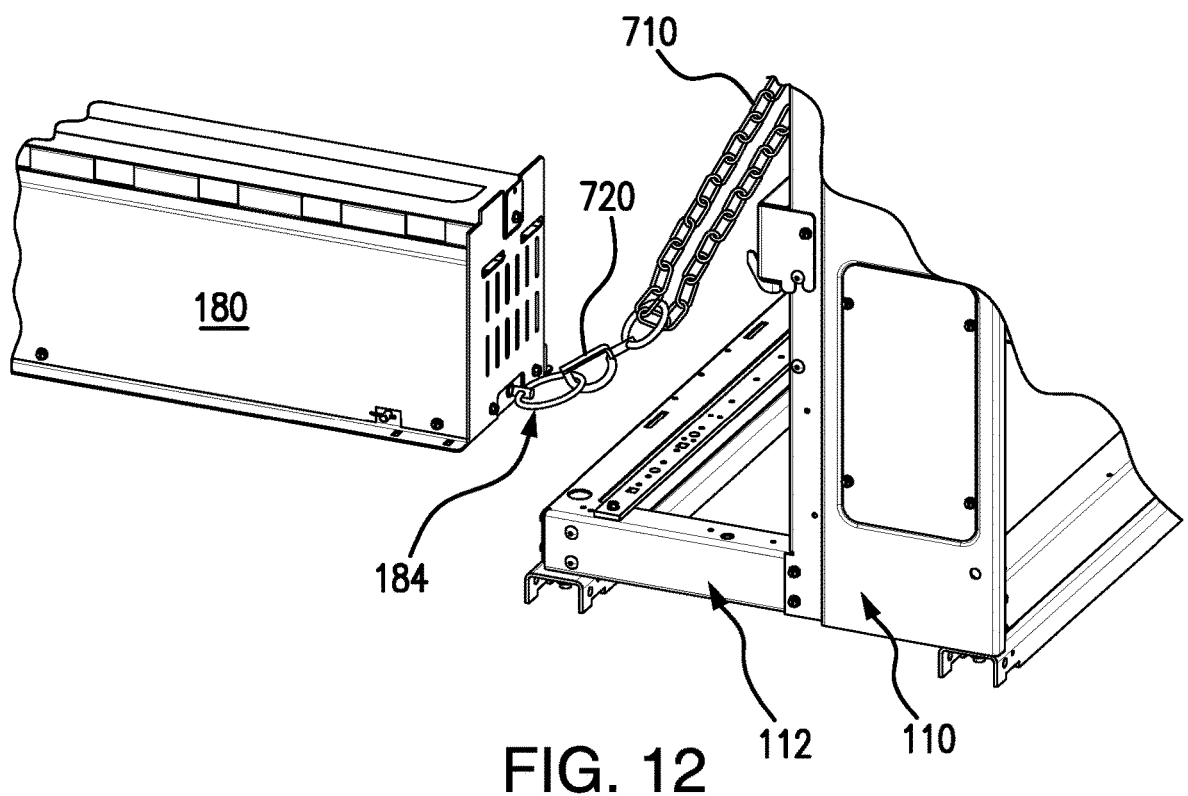
FIG. 12 illustrates a partial view of the frame of the electrical device and the electrical component with the eye bolt in FIG. 11 connected to a chain of the chain hoist mechanism, in accordance with an embodiment.
Figure 13:
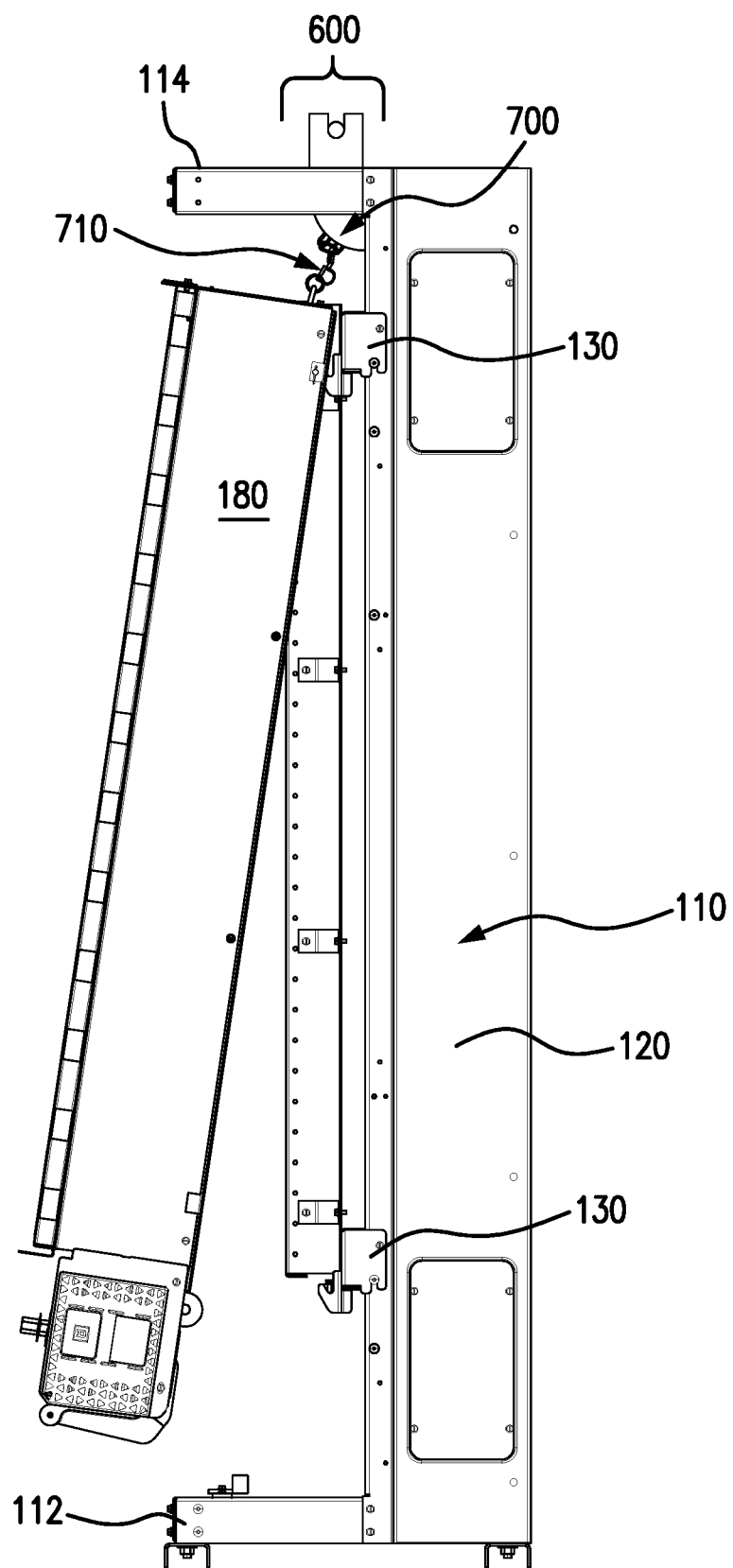
FIG. 13 illustrates a side view of the frame of the electrical device and the electrical component in FIGS. 9-12 lifted into the frame using the chain hoist mechanism, in accordance with an embodiment.
Figure 14:
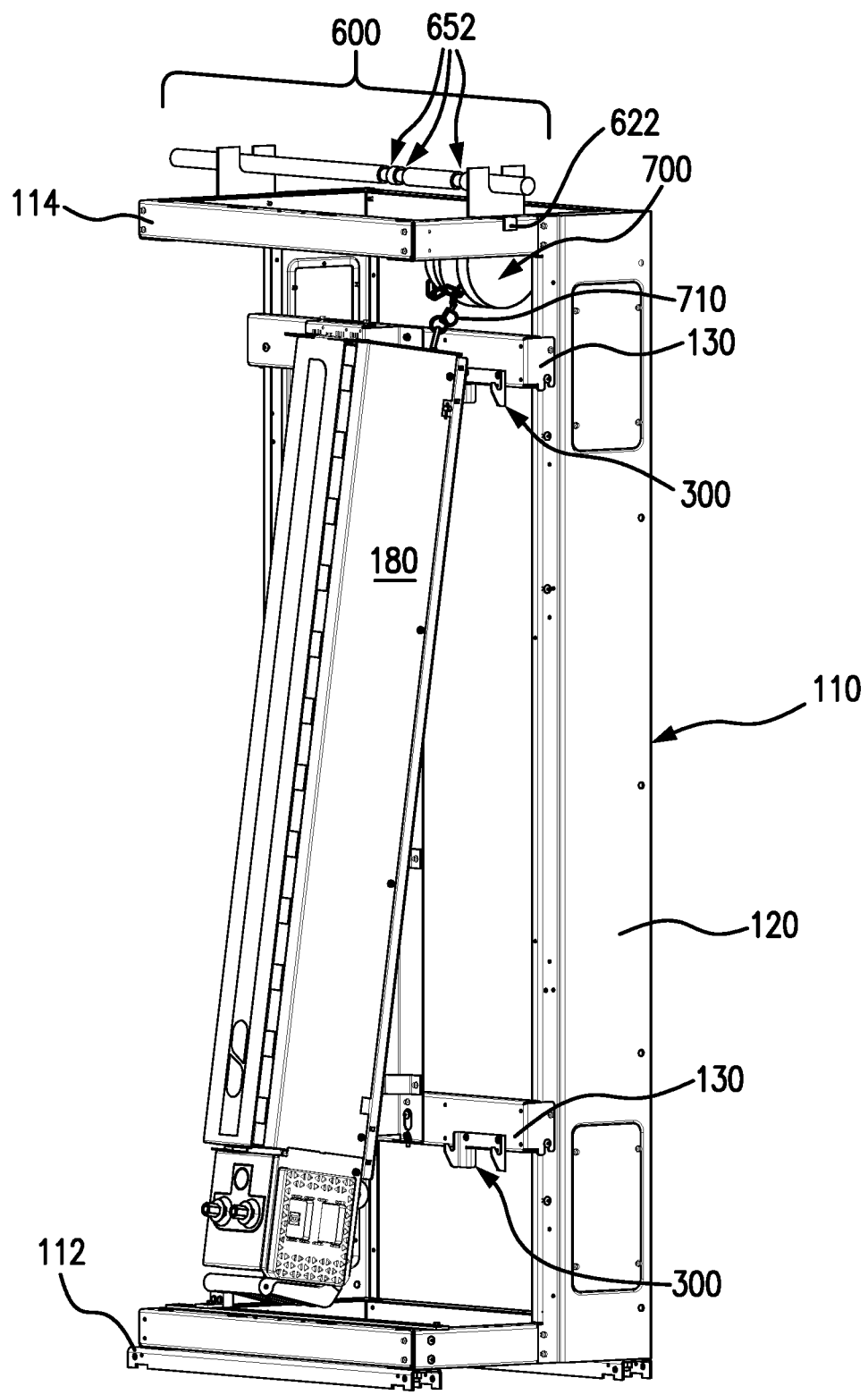
FIG. 14 illustrates a perspective view of the frame of the electrical device and the electrical component in FIGS. 9-12 lifted into the frame using the chain hoist mechanism, in accordance with an embodiment.

An operational assembly example in which a component of the electrical device 100 is assembled in the frame 110 will be described with reference to FIGS. 9-17. As shown in FIG. 9, the hoist mechanism 700 and its chain 710 is aligned with the hooks 510 of the hook brackets 300. The chain 710 is then connected, directly or indirectly, to the component to be assembled. In this example, the component is an electrical component, such as a bus assembly 180 (e.g., bus stack such as I-line™ bus for a I-line™ switchboard), which is unpackaged and placed in front of the frame 110. For example, as shown in FIG. 10, an end of the bus assembly 180 can include a threaded hole 182 for connecting an eye bolt 184 as shown in FIG. 11. As further shown in FIG. 12, the eyebolt 184 is connected to a load end of the chain 710 using a clip 720 (e.g., a grip, clasp, hook, etc.) which is connected to the chain 710. Thereafter, as shown in FIGS. 13 and 14, the hoist mechanism 700 is operated to retract or pull the chain 710 in order to lift the bus assembly 180 up and into the frame 110. The hoist mechanism 700 can be configured to operate manually or electrically.

Figure 17:
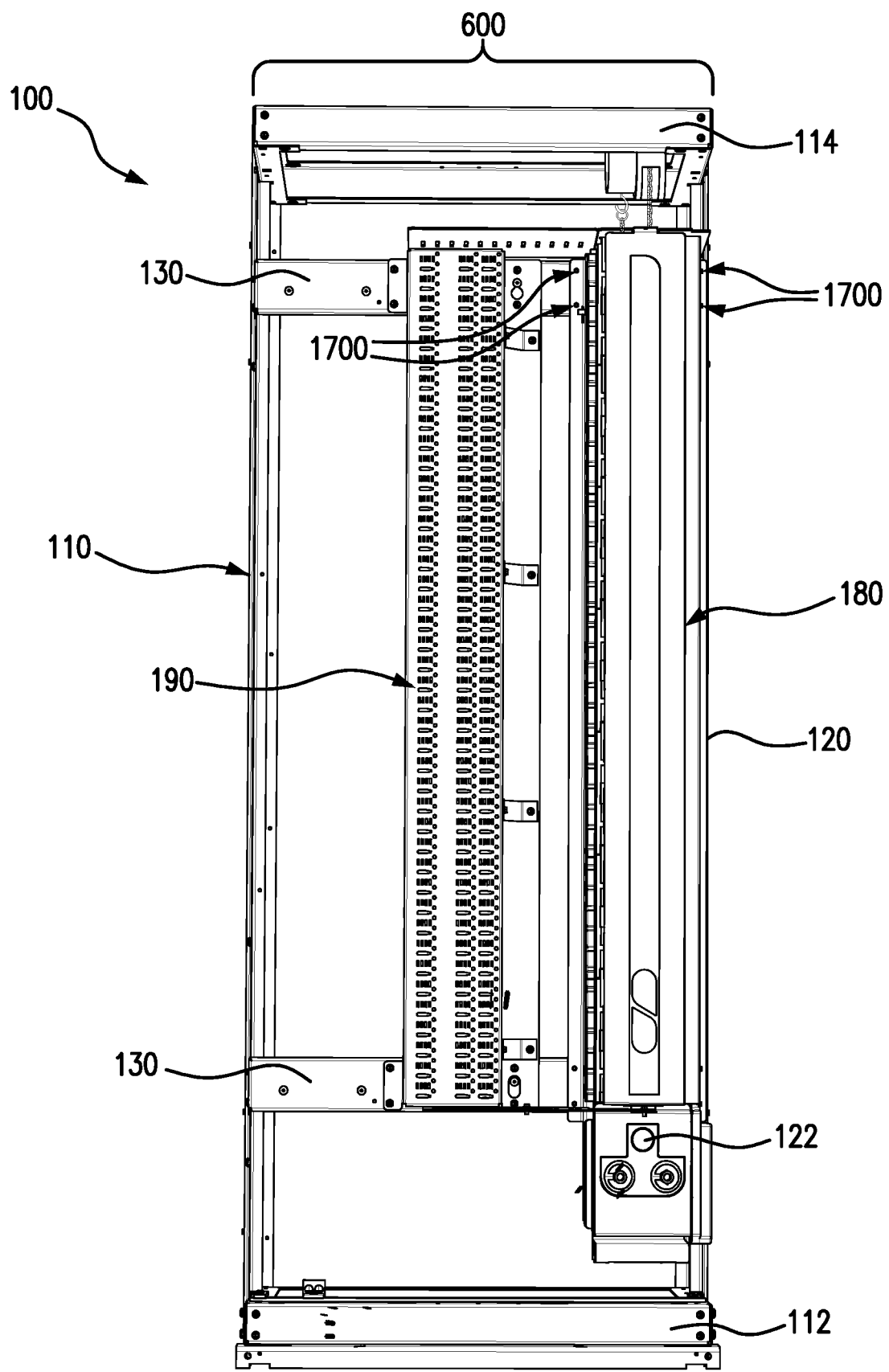
FIG. 17 illustrates a front view of the electrical component lifted and positioned in the frame, and attached to the frame or its support member using hardware such as fasteners, in accordance with an embodiment.

As shown in FIGS. 15 and 16, the bus assembly 180 includes a rod 1500 which extend across a back side of the bus assembly 180. In this example, the bus assembly 180 includes one or more rods 1500 with sufficient clearance around the rod(s) for one or more hook brackets 300 and their hook(s) 510. As the bus assembly 180 is lifted by the hoist mechanism 700, the top rod 1500 eventually makes contact with and is guided by the external surface 512 of the hooks 510 of the top hook bracket 300, e.g., rides up a ramp defined by the external surface 512. As the bus assembly continues to be lifted the top rod 1500 reaches and passes the tip 514 of the hooks 510, and then swings back towards the base 500 of the hook bracket and slides into the groove 516 of the hooks 510 (e.g., rides down into the groove 516) so that the bus assembly 180 is latched to the top hook bracket 300. Similarly, at the same time, the bottom rod 1500 of the bus assembly 180, if present, also may be guided by the external surface 512 of the hooks of the bottom hook bracket 300, may pass the tip 514 of the hooks, and may slide into the groove 516 of the hooks 510 of the bottom hook bracket 300 so that the bus assembly 180 is latched to the bottom hook bracket 300. As shown in FIG. 17, the hooks 510 of the hook brackets 300 thereafter support the bus assembly 180 at a predetermined position relative to or in close proximity to the frame 110 or subsections thereof including the support member 130. For example, the bus assembly 180 is held in close proximity to the frame 110 (or section thereof) or structural member of the electrical device 100. Thereafter, the bus assembly 180 can be attached to the frame 110 or structural member of the electrical device 100 using hardware.

In this example, the hardware can be a fastener 1700 such as a screw or bolt. The bus assembly 180 is latched in and supported by the hooks 510 of the hook brackets 300 at a position in which the holes of the frame 110 or its support members 130 are aligned with holes on the bus assembly 180 (or its enclosure or housing). The fasteners 1700 can then be engaged in the holes to securely attach the bus assembly to the frame 110 or structural member of the electrical device 100. Thereafter, the hoist assembly 600 can be disassembled and removed from the frame, if no longer needed, and re-used for other device assembly.

Figure 18:
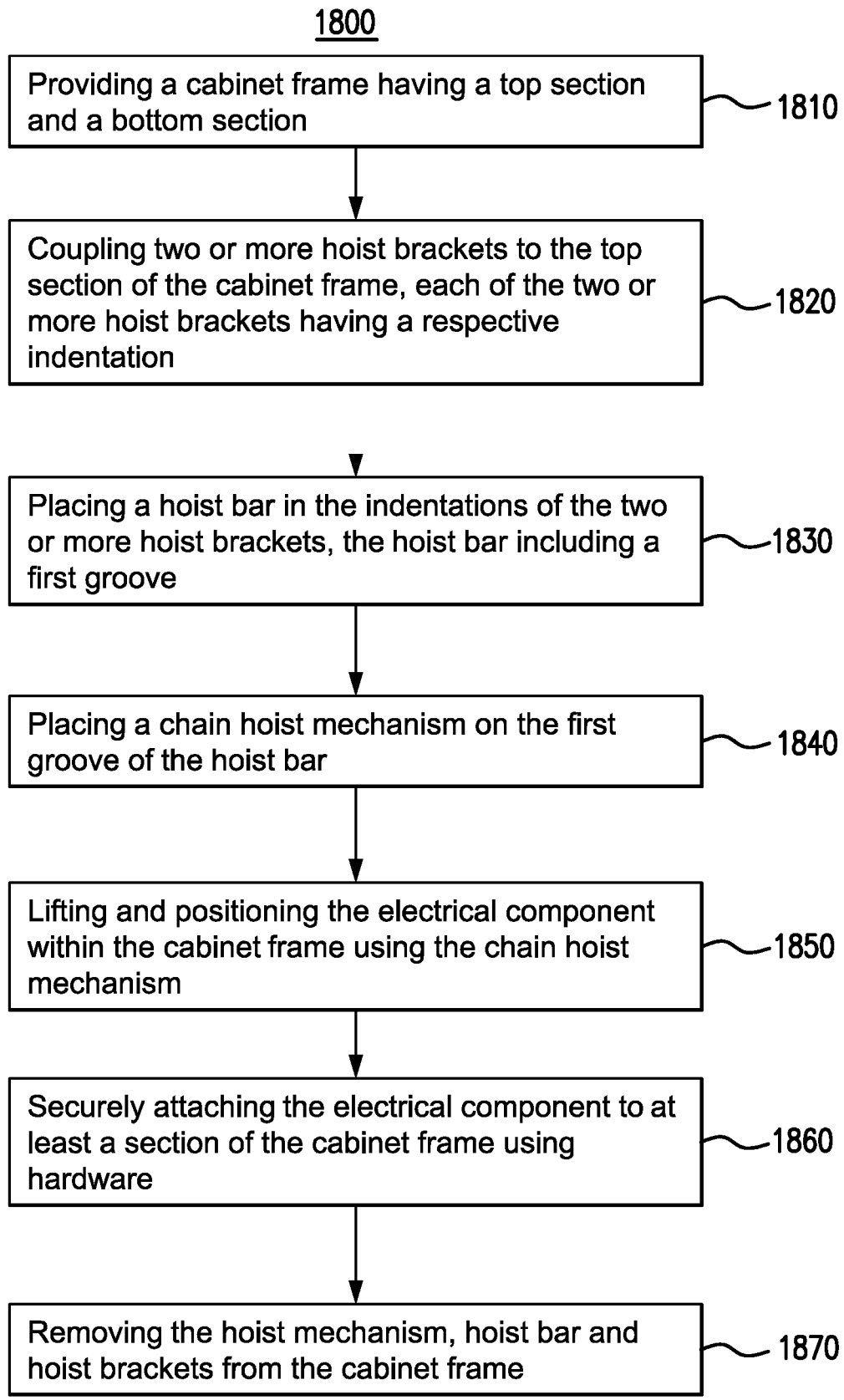
FIG. 18 illustrates a flow chart of a method of assembling an electrical component of an electrical device, in accordance with an embodiment.

FIG. 18 illustrates a flow chart of a method 1800 of assembling an electrical component of an electrical device of a power distribution system, in accordance with an embodiment.

The method 1800 begins at block 1810 in which a cabinet frame is provided.

The cabinet frame can include a top section and a bottom section. The bottom section can be configured to rest on an underlying supporting surface, and the top section can be positioned at an opposing side of the cabinet frame from the bottom section.

At block 1820, two or more hoist brackets are coupled to the top section of the cabinet frame. Each of the two or more hoist brackets can have a respective indentation.

At block 1830, a hoist bar is placed in the indentations of the two or more hoist brackets. The hoist bar can include a first groove for a chain hoist mechanism.

At block 1840, a chain hoist mechanism is placed on the first groove of the hoist bar. The chain hoist mechanism can be configured to facilitate lifting and positioning of an electrical component within the cabinet frame. In various embodiments, the electrical component can be a component of a switchboard. Such a component can include a bus assembly or other electrical component of the electrical device.

At block 1850, the electrical component is lifted and positioned within the cabinet frame using the chain hoist mechanism.

At block 1860, the electrical component is securely attached to a section of the cabinet frame using hardware.

At block 1870, the hoist assembly, such as the hoist mechanism, hoist bar and hoist brackets, are removed from the cabinet frame.

Figure 19:
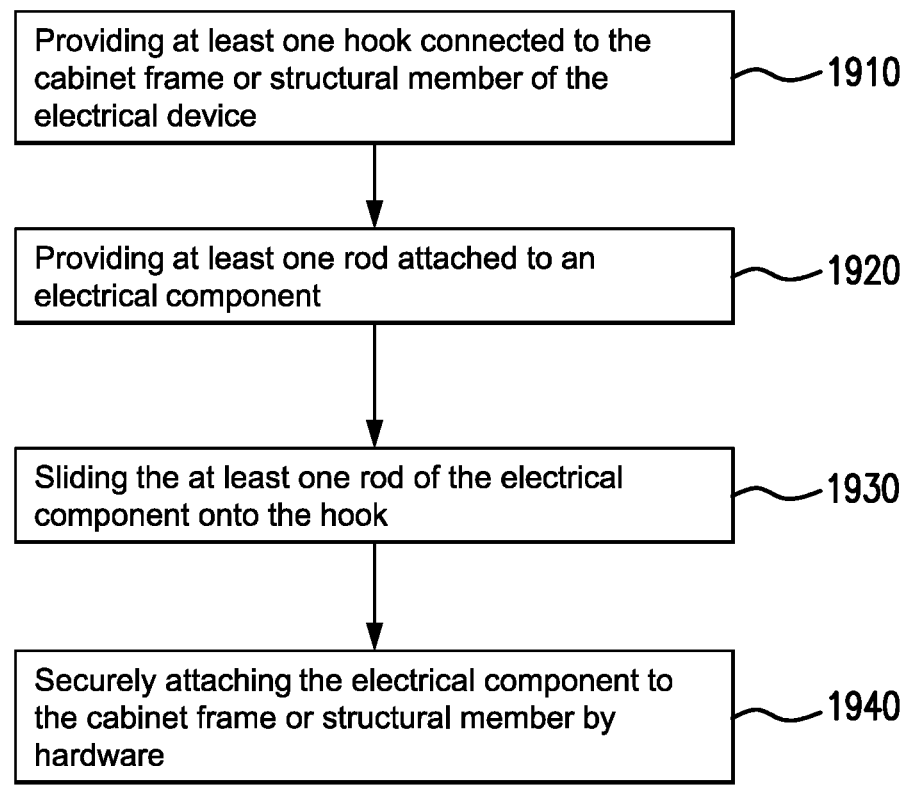
FIG. 19 illustrates a flow chart of a method of assembling an electrical component of an electrical device, in accordance with an embodiment.

FIG. 19 illustrates a flow chart of a method 1900 of assembling an electrical component of an electrical device of a power distribution system, in accordance with an embodiment.

The method 1900 begins at block 1910 in which at least one hook is provided which is connected to the cabinet frame or structural member of the electrical device. For example, a support member can be provided, which includes the at least one hook and has two opposite ends. Each end of the support member can include a slot for engaging a corresponding pin on the cabinet frame, and a fastener hole through which to fasten the end to the cabinet frame using a fastener. The slot at each end of the support member can be engaged to corresponding pin on the cabinet frame. The support member can pivot (or swing) about the pins to align the fastener hole to a respective hole on the cabinet frame. A fastener can be secured through the aligned fastener hole at each end of the support member.

At block 1920, at least one rod is provided, which is attached to an electrical component. In various embodiments, the electrical component can be a component of a switchboard. Such a component can include a bus assembly or other electrical component of the electrical device.

At block 1930, the at least one rod of the electrical component slides onto the hook such that the electrical component is held in close proximity to the cabinet frame or structural member of the electrical device.

At block 1940, the electrical component is securely attached to the cabinet frame or structural member of the electrical device by hardware.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and can be given a different name or label. The use of the term "or" is not limited to exclusive "or", but can also mean "and/or".

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A system for supporting an electrical component in an electrical device of an electrical distribution system, the system comprising:
   a pair of hooks connected to a cabinet frame or structural member of the electrical device; and
   at least one rod attached to the electrical component, the at least one rod configured to be slidably received in the pair of hooks such that the electrical component is held in close proximity to the cabinet frame or structural member of the electrical device while the electrical component is being attached to the cabinet frame or structural member by hardware,
   wherein the pair of hooks includes:
   a base on a back side of the pair of hooks;
   a ramp profile on a front side of the pair of hooks that extends along a majority of the front side of the pair of hooks, the ramp profile being configured to guide for guiding the at least one rod attached to the electrical component as the electrical component is being lifted;
   a tip spaced apart from the ramp profile on the front side of the pair of hooks; and
   a groove configured to receive the at least one rod.

2. The system according to claim 1, further comprising:
   a support member including the pair of hooks and having two opposite ends, each of the opposite ends including a slot configured to engage a corresponding pin on the cabinet frame and a fastener hole configured to engage a fastener to fasten the end to the cabinet frame when the slot is engaged to the corresponding pin on each end and the support member is pivoted about the corresponding pin to align the fastener hole to a respective hole on the cabinet frame.

3. The system according to claim 2, wherein the slot at each end of the support has an L-shape.

4. The system according to claim 1, wherein the at least one rod is configured to be lifted up and into the groove.

5. The system according to claim 1, wherein the ramp profile is configured to guide the at least one rod as the at least one rod is lifted upwards toward the tip and subsequently over the tip into the groove.

6. A system for supporting an electrical component in an electrical device of an electrical distribution system, the system comprising:
   at least one hook connected to a cabinet frame or structural member of the electrical device; and
   at least one rod attached to the electrical component, the at least one rod configured to be slidably received in the such that the electrical component is held in close proximity to the cabinet frame or structural member of the electrical device while the electrical component is being attached to the cabinet frame or structural member by hardware,
   wherein the at least one hook comprises:
   a base having a front side and an opposite back side;
   a pair of hooks, extending from the front of the base, configured to support the electrical component; and
   a stop that extends from the back of the base and is configured to abut against a portion of the support member.

7. The system according to claim 6, wherein the hardware comprise a plurality of fasteners configured to engage corresponding holes on the cabinet frame or structural member of the electrical device and the electrical component and attach the electrical component to the cabinet frame or structural member.

8. A system for supporting an electrical component in an electrical device of an electrical distribution system, the system comprising:
   at least one hook connected to a cabinet frame or structural member of the electrical device; and
   at least one rod attached to the electrical component, the at least one rod configured to be slidably received in the such that the electrical component is held in close proximity to the cabinet frame or structural member of the electrical device while the electrical component is being attached to the cabinet frame or structural member by hardware,
   wherein the at least one hook comprises:
   a base having a front side and an opposite back side;
   a pair of hooks, extending from the front of the base, configured to support the electrical component; and
   a stop that extends from the back of the base and is configured to abut against a portion of the cabinet frame or structural member.

9. The system according to claim 8, wherein the pair of hooks extends from opposite ends of the base.

10. The system according to claim 8, wherein the base includes a plurality of fastener holes configured to fasten the at least one hook to the cabinet frame or structural member of the electrical device using fasteners.

11. The system according to claim 8, wherein the at least one hook is formed as a unitary or single-piece component.

12. The system according to claim 8, wherein the electrical device comprises a switchboard, and the electrical component comprises an electrical switchboard component.

13. The system according to claim 12, wherein the electrical switchboard component comprises a bus assembly for the switchboard.

14. A method of assembling an electrical device having a cabinet frame, comprising:
   providing at least one hook connected to the cabinet frame or structural member of the electrical device;
   providing at least one rod attached to an electrical component;
   sliding the at least one rod of the electrical component onto the such that the electrical component is held in close proximity to the cabinet frame or structural member of the electrical device; and
   attaching the electrical component to the cabinet frame or structural member by hardware,
   wherein the includes:
   a base on a back side of the at least one hook;
   a ramp profile on a front side of the at least one hook that extends along a majority of the front side of the at least one hook, the ramp profile being configured to guide the at least one rod attached to an electrical component as the electrical component is being lifted;
   a tip spaced apart from the ramp profile on the front side of the pair of hooks; and
   a groove configured to receive the at least one rod.

15. The method according to claim 14, wherein the providing at least one hook comprises:
   providing a support member including the and having two opposite ends, each of the opposite ends including a slot configured to engage for engaging a corresponding pin on the cabinet frame and a fastener hole configured to engage a fastener to fasten the end to the cabinet frame;
   engaging the slot at each end of the support member to a corresponding pin on the cabinet frame;
   pivoting the support member about the pins to align the fastener hole to a respective hole on the cabinet frame; and
   securing a fastener through the aligned fastener hole at each end of the support member.

16. The method according to claim 14, wherein the at least one hook comprises:
   a pair of hooks, extending from the front of the base, configured to support the electrical component; and
   a stop that extends from the back of the base and is configured to abut against a portion of the cabinet frame or structural member to provide relief for some of the weight of the electrical component when supported in the pair of hooks.

17. The method according to claim 16, wherein the electrical device comprises a switchboard, and the electrical component comprises an electrical switchboard component.

18. The method according to claim 16, wherein the electrical switchboard component comprises a bus assembly for the switchboard.

19. The method according to claim 14, wherein the ramp profile is configured to guide the at least one rod as the at least one rod is lifted upwards toward the tip and subsequently over the tip into the groove.

20. A system for supporting an electrical component in an electrical device of an electrical distribution system, the system comprising:
   at least one hook connected to a cabinet frame or structural member of the electrical device; and
   at least one rod attached to the electrical component, the at least one rod configured to be slidably received in the such that the electrical component is held in close proximity to the cabinet frame or structural member of the electrical device while the electrical component is being attached to the cabinet frame or structural member by hardware,
   wherein the at least one hook comprises:
   a base having a front side and an opposite back side;
   one or more hooks, extending from the front of the base, configured to support the electrical component; and
   a stop that extends from the back of the base and is configured to abut against a portion of the cabinet frame or structural member.

* * * * *